United States Patent Office.

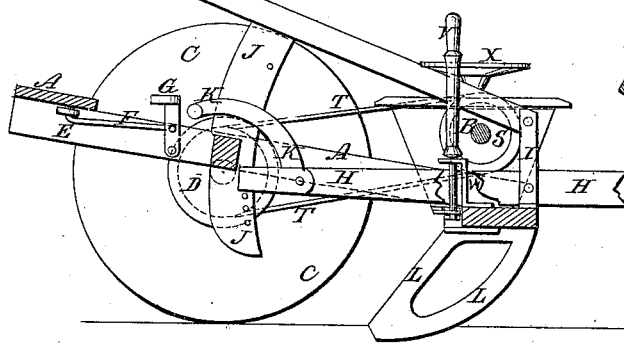
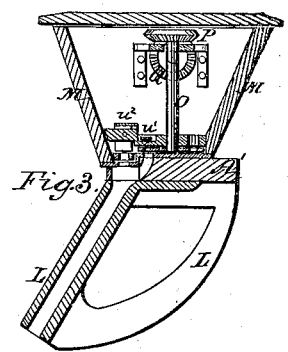
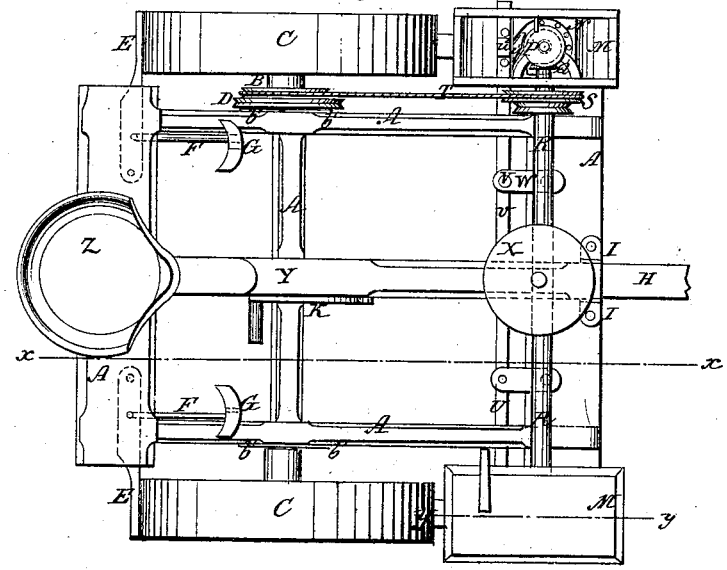

W. H. COX, OF VIRDEN, ILLINOIS.

*Letters Patent No. 87,825, dated March 16, 1869.*

---

IMPROVEMENT IN CORN-PLANTERS.

---

The Schedule referred to in these Letters Patent and making part of the same.

---

*To all whom it may concern:*

Be it known that I, W. H. Cox, of Virden, in the county of Macoupin, and State of Illinois, have invented a new and useful Improvement in Corn-Planters; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved corn-planter, taken through the line x x, fig. 2.

Figure 2 is a top or plan view of the same.

Figure 3 is a detail sectional view of the same, taken through the line y y, fig. 2.

Similar letters of reference indicate like parts.

My invention has for its object to improve the construction of my improved corn-planter, patented October 23, 1866, and numbered 58,988, so as to make it more convenient and effective in operation; and It consists in the construction and combination of various parts of the machine, as hereinafter more fully described.

A is the frame of the machine, to which are securely attached the axles B, upon which the wheels C revolve.

The axles B are made with a cross-head, or laterally-projecting arms, $b'$, which extend along the side bars of the frame A, and serve to make the connection between said axle and frame stronger and more rigid.

The wheels C are made of cast-iron, and the inner ends of the hubs are made long, as shown in fig. 2, so as to receive the grooved cone-pulley D, by which the dropping-device is operated, and which is keyed, or otherwise detachably secured to said hub, so that the said pulley may be placed upon the hub of either wheel, as may be desired or convenient.

E are scrapers for cleaning the wheels C, by scraping off the soil that may adhere to them.

The shanks, or inner ends of the scrapers E, are pivoted to the rear cross-bar of the frame A.

F are connecting-rods, or bars, one end of which is pivoted to the scrapers E, and their other ends are pivoted to the foot-levers G.

The lower ends of the foot-levers G are pivoted to the side bar of the frame A, and their upper ends extend up into such a position that they may be easily reached and operated by the driver, with his feet, to move the scrapers, E, against the wheels C, or away from them.

H is the tongue, which is pivoted to and between the supports I, attached to the forward part of the frame A.

The rear end of the tongue H is forked or slotted, or has a forked or slotted metallic cap, or block, attached to it, which moves up and down upon the curved standard J, attached to the frame A, and which guides the rear end of said tongue in its upward and downward movement, and, at the same time, supports it against side pressure.

The up-and-down movement of the rear end of the tongue H is limited, by stop-pins passing through the standard J, the lower one of which pins has several holes formed for its reception in the standard J, so that it may be adjusted according to the depth at which it is desired to plant the seed.

K is a curved arm, the lower end of which is attached to the rear end of the tongue H, and its upper end extends up into such a position, and is so formed that the driver, with his foot, may operate it to raise or lower the rear end of the tongue H, as desired.

L are the cutters, or runners, by which the ground is opened to receive the seed, and which are in shape something like the forward part of a sleigh-runner, or in about the form shown in the drawings.

The runners L are attached to the end parts of the front cross-bar or platform of the frame A, in such positions as to be directly in front of the wheels C, so that the said wheels C, as they advance, may press down the soil and cover the seed.

The rear parts of the runners L are perforated, as shown in fig. 3, to form a channel, or conducting-spout, to conduct the seed from the hoppers, or seed-boxes M, to the ground.

By this form of the runner, I am enabled to set it well back toward the covering-wheel, to discharge the seed in an inclined direction, immediately under the tread of said wheel.

The curved portion of the cutter is brought in contact with the ground, so near the centre of gravity of the machine, that in hard ground or tough sod, the draught of the team tends to throw the weight of the machine and driver upon the points of the cutters, and thus force their cutting-edges into the ground.

As soon as the cutting-edges come in contact with the ground, the friction draws them downward, and further under the wheels, sinking into the ground as far as the pin, upon which the rear end of the tongue rests, will permit.

It will also be observed that the entire cutting-edge of the cutter is not brought into action, but only such portion as is necessary to open the furrow.

M are the hoppers, or seed-boxes, which are attached to the front cross-bar or platform of the frame A, directly over the runners L.

N are circular horizontal disks, placed and working in recesses formed in the bottoms of the hoppers, M, and which are provided with a series of holes, by which the seed is conveyed to an opening in the bottom of said hoppers, through which the said seed passes into the conducting-spout of the runners L.

The part of the recess in which the perforated disk N works, is covered with a cap provided with a spring cut-off, $n^1$, by which the passage to the discharge-opening, of any more seed than sufficient to fill the holes in said disks, is effectually prevented.

In the centre of the disks N are formed square holes into which fit the square lower ends of the vertical shafts O, which work in bearings attached to the hoppers M, and to the upper ends of which are attached bevel-gear wheels P, into the teeth of which mesh the teeth of the bevel-gear wheels Q, attached to the ends of the horizontal shaft R.

The shaft R extends across the machine and works in bearings in the inner sides of the hoppers M.

S is a grooved cone-pulley, keyed, or otherwise detachably secured to the said shaft R, near one of its ends, and around which, and around the cone-pulley D of the wheel C, passes the chain or belt T, so that the dropping-device may be operated automatically by the advance of the machine, and at a greater or less velocity, as may be desired.

The dropping-device above described is designed to be used when the seed is to be planted in drills.

When the seed is to be planted in hills, another device is used, which I will now describe.

In the rear parts of the bottoms of the hoppers M, are formed other recesses, through which pass the ends of the sliding cross-bar U, the parts of which that pass through said recesses having holes formed in them of sufficient size to hold the quantity of seed required for a hill, and by which said seed is carried to an opening in the bottom of said recess, through which it passes to the conducting-spout, or channel, in the runner L.

The part of the recess directly above the discharge-opening is covered with a cap, provided with a cut-off, $n^2$, to prevent any more seed being carried to the discharge-opening than sufficient to form a hill.

V is a lever, which passes down vertically through a hole in the arm W, the lower end of which is rigidly attached to the frame A, in such a position that the upper end of the lever V may be reached and operated by a person sitting upon the seat X.

The lower end of the lever V enters a hole in the bar U, so that the said bar may be operated to drop the seed, by operating the lever V.

The holes in the bar U, which receive the seed to be dropped, should be so arranged, that the seed for two hills, one at each side of the machine, will be dropped at the same time and by the same movement of the bar U.

Y is a bar, attached to and supported by the supports I and standard J, in an inclined position, and to the rear, or upper end of which, the driver's seat, Z, is attached.

To the forward, or lower part of the bar Y, is attached a seat, X, for the person who operates the hand-lever V.

I am aware that seed-spouts and cutters, or runners, have heretofore been cast in one piece, but this I do not claim.

What I do claim, and desire to secure by Letters Patent, is—

1. The cutters and seed-spouts L, constructed as described, to conduct the seed obliquely backward under the tread of the covering-wheels, the cutting-edges being also extended backward, substantially as described for the purpose specified.

2. The combination and arrangement of the tongue H and arm K with the supports I, standard J, and frame A, substantially as herein shown and described for the purpose specified.

W. H. COX.

Witnesses:
   H. C. POWELL,
   BALFOUR COWEN.